(12) United States Patent
Choi et al.

(10) Patent No.: US 8,297,758 B2
(45) Date of Patent: Oct. 30, 2012

(54) MULTIMEDIA PLAYER DISPLAYING 2 PROJECTION IMAGES

(75) Inventors: Byeong-Dae Choi, Daegu (KR); Dae-Hwan Kim, Daegu (KR)

(73) Assignee: Daegu Gyeongbuk Institute of Science and Technology, Dalseong-gun, Daegu (KR)

( * ) Notice: Subject to any disclaimer, the term of this patent is extended or adjusted under 35 U.S.C. 154(b) by 385 days.

(21) Appl. No.: 12/449,647

(22) PCT Filed: Feb. 19, 2008

(86) PCT No.: PCT/KR2008/000968
§ 371 (c)(1),
(2), (4) Date: Aug. 19, 2009

(87) PCT Pub. No.: WO2008/102971
PCT Pub. Date: Aug. 28, 2008

(65) Prior Publication Data
US 2010/0110385 A1 May 6, 2010

(30) Foreign Application Priority Data

Feb. 20, 2007 (KR) .................. 10-2007-0017108
Feb. 19, 2008 (KR) .................. 10-2008-0014706

(51) Int. Cl.
*G03B 21/26* (2006.01)

(52) U.S. Cl. ............. 353/94; 353/15; 353/20; 353/30; 353/31; 353/33; 353/69; 353/70; 353/46; 353/48; 353/50; 353/10; 353/82; 353/98; 353/99; 353/122; 353/49; 353/34; 353/39; 353/119

(58) Field of Classification Search .......... 353/15, 353/20, 30, 31, 33, 69, 70, 46, 48, 50, 10, 353/82, 98, 99, 122, 49, 34, 39, 119; 349/5, 349/7, 8, 9, 58, 75, 122, 155, 156, 157; 359/237, 359/245, 246, 248, 249, 321
See application file for complete search history.

(56) References Cited

U.S. PATENT DOCUMENTS
5,428,415 A * 6/1995 Keelan et al. ............... 353/71
(Continued)

FOREIGN PATENT DOCUMENTS
DE 102-44-017 9/2002
(Continued)

*Primary Examiner* — Georgia Y Epps
*Assistant Examiner* — Sultan Chowdhury
(74) *Attorney, Agent, or Firm* — Stein McEwen, LLP

(57) ABSTRACT

A multimedia player for providing two projection images is provided. The multimedia player for displaying two projection images includes: a first projection unit displaying a first projection image; and a second projection unit displaying a second projection image. The first projection unit includes: a first driving unit controlling an operation of the first projection unit and providing an image signal on the first projection image to be displayed; a first light source unit; a first light modulation device outputting the first projection image by modulating light provided from the light source in response to the image signal of the first projection image; and a first projection lens unit magnifying and projecting an image that is output from the first light modulation device. The structure of the first projection unit is the same as that of the second projection unit. The multimedia player further includes a screen sensing unit sensing a color of an area in which an image is to be displayed. The first and second driving units detect a complementary color of a color sensed by the screen sensing unit and increase brightness of a light source corresponding to the complementary color among light sources of the first and second light source units or image data corresponding to the complementary color among image data to be displayed, thereby improving visibility.

7 Claims, 2 Drawing Sheets

U.S. PATENT DOCUMENTS

| | | | | |
|---|---|---|---|---|
| 5,469,295 A * | 11/1995 | Burke | | 359/478 |
| 5,669,690 A * | 9/1997 | Hodson et al. | | 353/122 |
| 6,547,398 B2 * | 4/2003 | Cho et al. | | 353/31 |
| 6,771,272 B2 * | 8/2004 | Deering | | 345/581 |
| 6,773,114 B2 * | 8/2004 | Pienimaa et al. | | 353/71 |
| 7,232,229 B2 * | 6/2007 | Peeters et al. | | 353/122 |
| 7,408,600 B2 * | 8/2008 | Yata et al. | | 349/75 |
| 7,438,421 B2 * | 10/2008 | Kang | | 353/31 |
| 7,901,084 B2 * | 3/2011 | Willey et al. | | 353/49 |
| 2005/0083486 A1 * | 4/2005 | Johnson | | 353/15 |

FOREIGN PATENT DOCUMENTS

| | | |
|---|---|---|
| JP | 09-185029 | 7/1997 |
| JP | 09-297361 | 11/1997 |
| JP | 10-304284 | 11/1998 |
| JP | 2000-241916 | 9/2000 |
| JP | 2004-085752 | 3/2004 |
| JP | 2004-514925 | 5/2004 |
| JP | 2005-038422 | 2/2005 |
| JP | 2006-138952 | 6/2006 |
| JP | 2006-184591 | 7/2006 |
| JP | 2006-235158 | 9/2006 |
| JP | 2006-295779 | 10/2006 |
| JP | 2006-330154 | 12/2006 |
| KR | 10-2001-0055499 | 7/2001 |
| KR | 10-2001-0056137 | 7/2001 |
| KR | 10-2003-00055 12 | 1/2003 |
| KR | 10-2008-0077443 | 8/2008 |
| WO | WO 01/57592 | 8/2001 |
| WO | WO 02/080579 | 10/2002 |
| WO | WO 03/005733 | 1/2003 |
| WO | WO 03/087884 | 10/2003 |
| WO | WO 2006/088275 | 8/2006 |

* cited by examiner

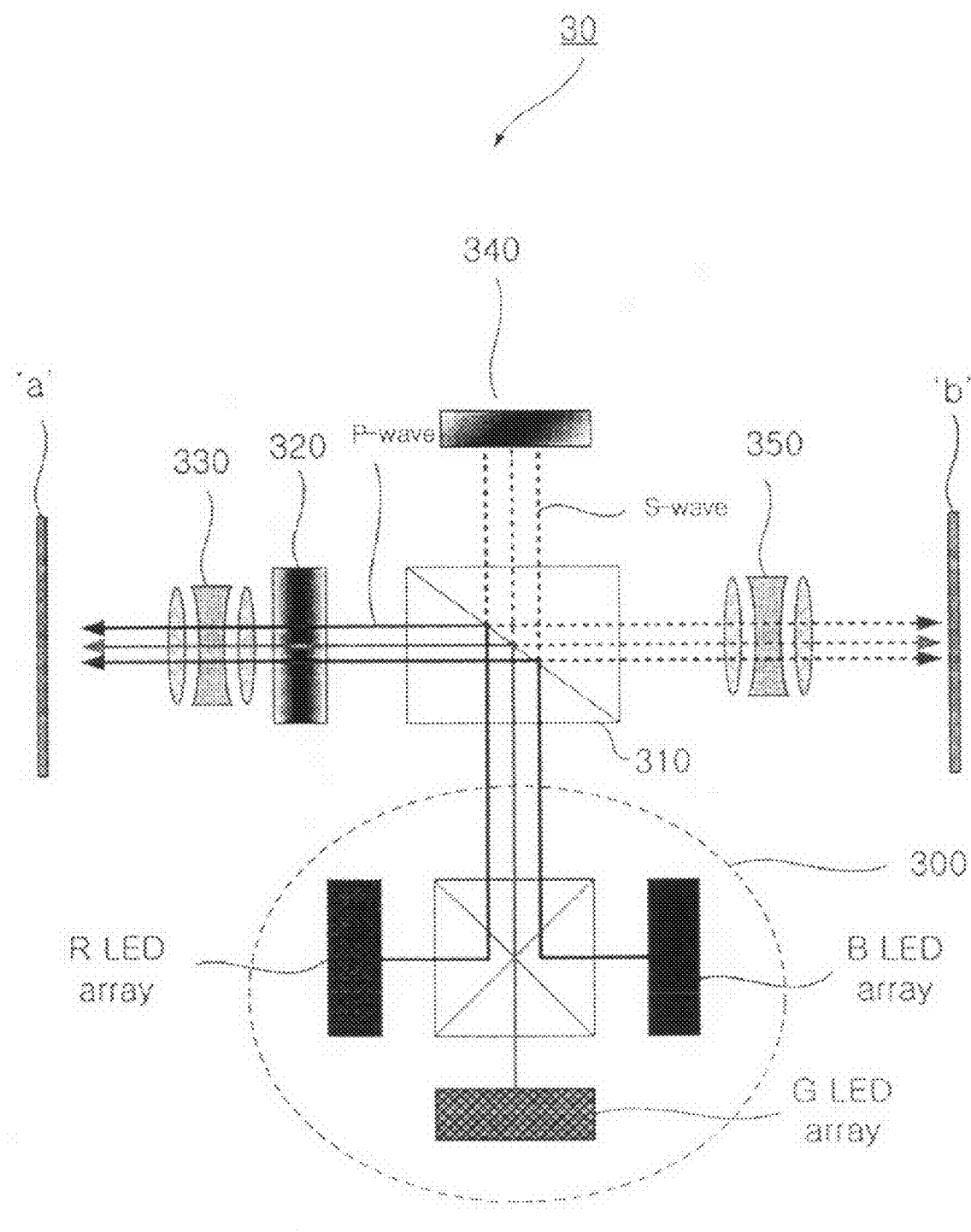

MULTIMEDIA PLAYER DISPLAYING 2 PROJECTION IMAGES

This is a National Phase Application filed under 35 U.S.C. 371 as a national stage of PCT/KR2008/000968, with the filing date of Feb. 19, 2008, an application claiming priority benefit from Korean Patent Application No. 10-2007-0017108, filed Feb. 20, 2007 and 10-2008-0014706, filed Feb. 19, 2008, the entire content of each of which is hereby incorporated by reference in its entirety.

TECHNICAL FIELD

The present invention relates to a multimedia player for providing two projection images, and more particularly, to a multimedia player for providing two projection images capable of displaying a clear image in any time without additional setting procedures.

BACKGROUND ART

As performance and a function of a mobile communication terminal have been improved, various types of multimedia contents have been provided. As the function of the mobile communication terminal is developed, digital display devices such as LCDs are used so as to provide a display with high image quality. However, the display devices have a limit in a size of an image. In order to solve the disadvantage, a size of a display screen of the mobile communication terminal has to be increased. Accordingly, a problem in that the size of the mobile communication terminal is increased is caused. This problem interrupts miniaturization and light-weighting of the mobile communication terminal and increases power consumption.

In order to solve this problem, methods in which a projection function is added to a mobile communication terminal have been suggested. The suggested methods include Korean Patent Application No. 10-2000-56807 entitled as "Wireless Terminal Device Having Projection Function and Method of Displaying the Same" and Korean Utility Model Registration Application No. 20-263336 entitled as "Mobile Video Phone Coupled with Liquid Crystal Projector". Since in the aforementioned methods, only a projection function is added to the mobile communication terminal, it is inconvenient to control a size of a scanning screen and resolution. On the other hand, in Korean Patent Application No. 10-2003-97087 entitled as "Mobile Communication Terminal for Scanning Projector Image in Various Directions", a mobile communication terminal in which it is possible to scan a projector image in various directions by installing a projector module protrudedly from the mobile communication terminal and rotating the projector module has been suggested.

In the aforementioned methods, since a distance between a mobile communication terminal and a screen is not fixed and changed according to situations, it is necessary to change settings of an optical system so as to focus an image according to the distance between the mobile communication terminal and the screen whenever the image is projected and displayed. Specifically, it is very difficult to accurately adjust the focus of the image on the screen by using the projection modules of the mobile communication terminal every time.

Accordingly, in the present invention, a multimedia player capable of providing two clear projection image at any time without additional settings of an optical system whenever a user uses the multimedia player is suggested.

DISCLOSURE

Technical Problem

The present invention provides a multimedia player capable of displaying two clear projection images at any time without additionally setting an optical system whenever the multimedia player is used.

The present invention also provides a multimedia player for providing two projection screens capable of concurrently displaying the two projection images to be used as a screen for an input device and a screen for outputting an image.

The present invention also provides a small multimedia player with low power consumption capable of clearly displaying two different projection images at any time.

Technical Solution

According to an aspect of the present invention, there is provided an multimedia player capable of displaying two projection images, the multimedia player comprising: a first projection unit displaying a first projection image; and a second projection unit displaying a second projection image, wherein the first projection unit comprises: a first driving unit controlling an operation of the first projection unit and providing an image signal of the first projection image to be displayed; a first light source unit; a first light modulation device outputting the first projection image by modulating light provided from the light source in response to the image signal on the first projection image; and a first projection lens unit magnifying and projecting an image that is output from the first light modulation device, and wherein the second projection unit comprises: a second driving unit controlling an operation of the second projection unit and providing an image signal on the second projection image to be displayed; a second light source unit; a second light modulation device outputting the second projection image by modulating light provided from the light source unit in response to the image signal of the second projection image; and a second projection lens unit magnifying and projecting an image that is output from the second light modulation device.

In the above aspect of the present invention, focal lengths of the first and second projection lens units may be initially set so that an image is projected at a predetermined position extended from a bottom plane over which the multimedia player is located. Ones of a LCD (liquid crystal display) panel, a DMD (digital micrometer device), a GLV (grating light valve) device, and an LCoS (liquid crystal on silicon) device may be selectively used as the first and second light modulation devices.

In addition, the aforementioned multimedia player may further include a screen sensing unit sensing a color of an area in which an image is to be displayed. The first and second driving units may detect a complementary color of a sensed color of a bottom plane by using the screen sensing unit and increase brightness of a light source corresponding to the complementary color among light sources of the first and second light source units. Alternatively, the first and second driving units may detect a complementary color of a sensed color of a bottom plane by using the screen sensing unit and increase image data corresponding to the complementary color among image data to be displayed.

According to another aspect of the present invention, there is provided a multimedia player providing two projection images which operates in a dual mode by concurrently providing first and second images by using a single light source unit, the multimedia player comprising: a driving unit controlling an entire operation and providing first and second image signals; a light source; a polarization beam splitter splitting light provided from the light source unit into first and second polarized light beams; a first light modulation device located in a path through which the first polarized light beam provided from the PBS (polarization beam splitter) proceeds, the first light modulation device modulating the first polarized light beam in response to a first image signal and providing the first image; a first projection lens unit magnifying and projecting the first image provided from the first light modulation device; a second light modulation device located in a path through which the second polarized light beam provided from the PBS proceeds, the second light modulation device modulating the second polarized light beam in response to a second image signal and providing the second image; and a second projection lens unit magnifying and projecting the second image provided from the second light modulation device, wherein images projected from the first and second projection lens units are formed at previously set first and second positions.

In the above aspect of the present invention, focal lengths of the first and second projection lens units may be initially set so that first and second images are projected at first and second predetermined positions extended from a bottom plane over which the multimedia player is located. A lamp unit of the light source unit may be constructed with LED arrays constructed with red (R), blue (B), and green (G) LEDs. The first and second light modulation devices may be transmissive or reflective light modulation devices.

Advantageous Effects

In the present invention, it is possible to display an image having a size greater than a predetermined size regardless of an entire size of a multimedia player for providing two projection screens.

In addition, the multimedia player according to an embodiment of the present invention forms an image at a predetermined distance from the multimedia player at any time by using a position extended from a bottom plane that is vertically or horizontally located as a screen. Accordingly, it is possible to see a clear projection image at any time by initially setting a focus of an optical system for performing a projection function. It is unnecessary to set the optical system whenever the multimedia player is used.

In addition, the multimedia player according to an embodiment of the present invention can project two different images onto a bottom plane by using a light source. The aforementioned multimedia player according to an embodiment of the present invention can be applied to a mobile or portable terminal which requires a small size and low power consumption.

In addition, the multimedia player according to an embodiment of the present invention senses a color of the bottom plane that is a screen and highlights the complementary color of the color of the bottom plane. It is possible to improve visibility of the image.

DESCRIPTION OF DRAWINGS

FIG. 3 is a schematic diagram illustrating an inner structure of a multimedia player for providing two projection images according to a second embodiment of the present invention.

BEST MODE

First Embodiment

Hereinafter, a structure and an operation of a multimedia player for providing two projection images according to a first embodiment of the present invention will be described in detail with reference to the accompanying drawings.

In the specification, the multimedia player includes all the terminals capable of reproducing multimedia contents, still images, or moving pictures, such as a mobile communication terminal, a personal digital assistant (PDA), a portable multimedia player (PMP), a play station portable (PSP), and the like.

Figure 1:
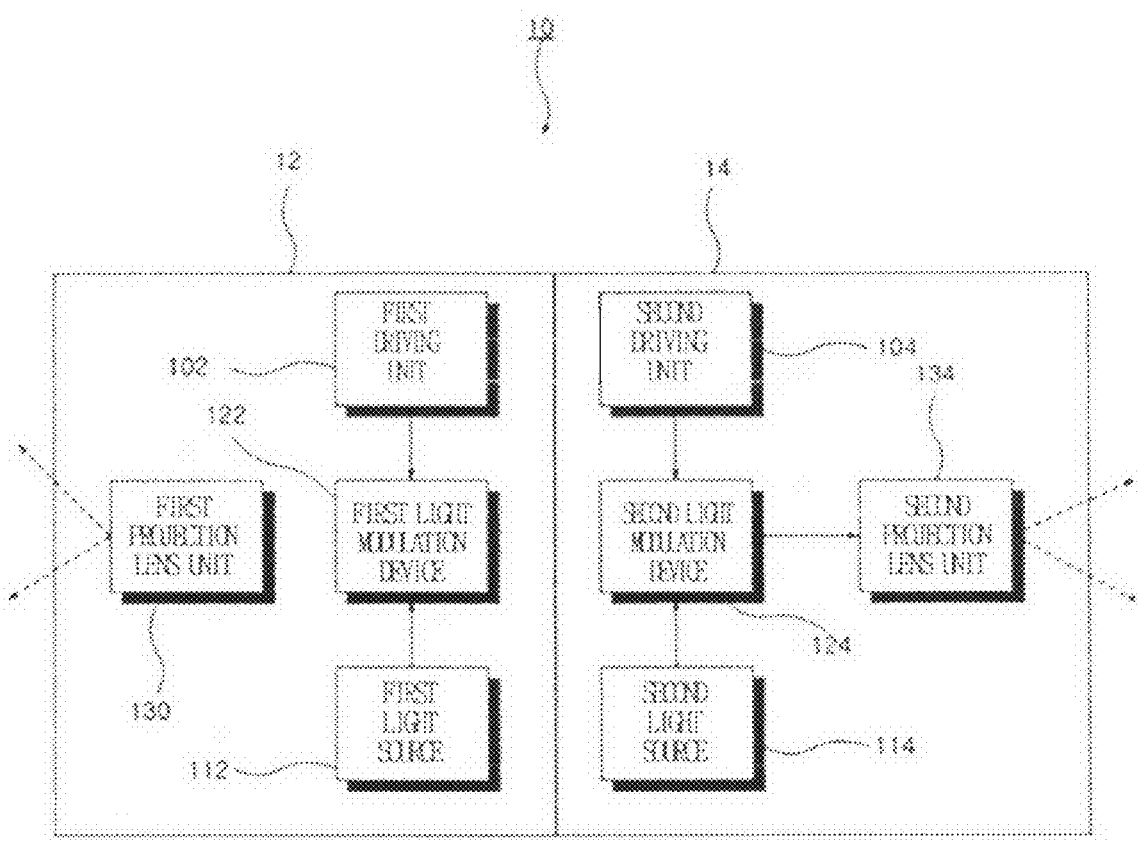
FIG. 1 is a schematic diagram illustrating components for performing a projection function of a multimedia player for providing two projection images according to a first embodiment of the present invention.
Figure 2:
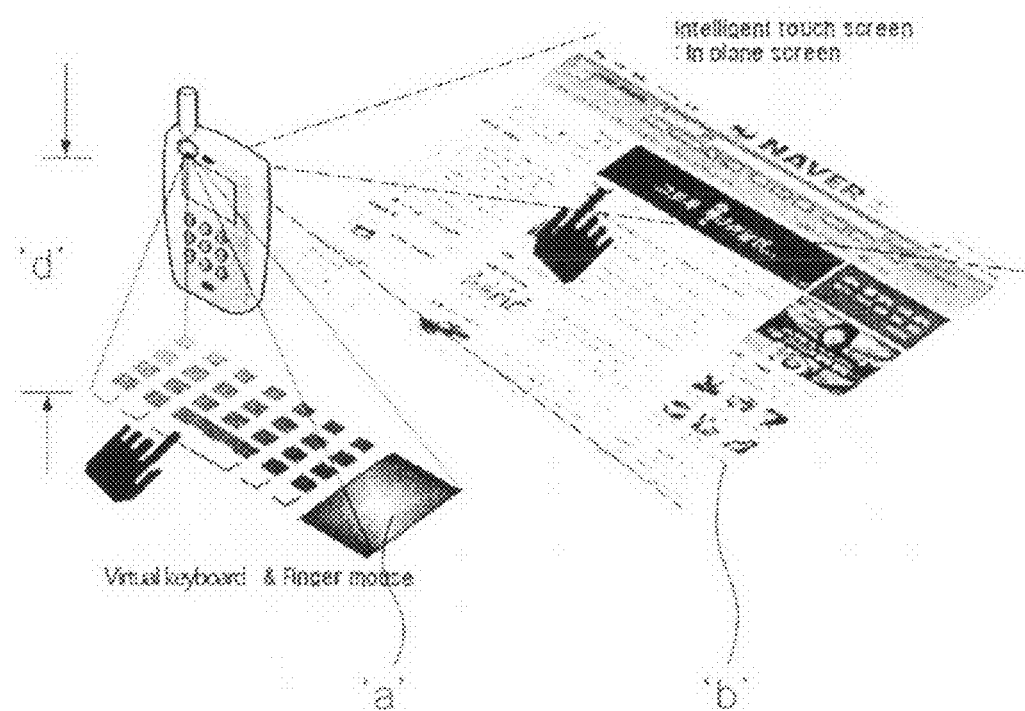
FIG. 2 illustrates an example of a state in the multimedia player for providing two projection images according to the first embodiment of the present invention operates.

FIG. 1 is a schematic block diagram illustrating components for performing a projection function of a multimedia player 10 for providing two projection images according to a first embodiment of the present invention. FIG. 2 illustrates a state in which a predetermined image is displayed through an operation of the multimedia player 10.

Referring to FIGS. 1 and 2, the multimedia player 10 according to the first embodiment of the present invention includes first and second projection units 12 and 14. The first projection unit 12 includes a first driving unit 102, a first light source unit 112, a first light modulation device 122, and a first projection lens unit 132. The second projection unit 14 includes a second driving unit 104, a second light source unit 114, a second light modulation device 124, and a second projection lens unit 134. However, since components of the multimedia player which are necessary for reproducing multimedia contents are known to those skilled in the art, description on the components will be omitted in the specification. Only components related to the subject matter of the invention will be described. Hereinafter, since a structure and an operation of the first projection unit are similar to those of the second projection unit, only the first projection unit will be described.

The first driving unit 102 controls an operation of the first projection unit 12 so as to display a first projection image. The first driving unit 102 controls operations of the first light source unit 112 and the first light modulation device 122. Specifically, the first driving unit provides an image signal corresponding to the first projection image to the light modulation device so as to display a predetermined first projection image.

The first light source unit 112 is constructed with a lamp unit, an optical system for uniformizing light such as a fly's eye lens, and the like. The lamp unit may be constructed with LEDs. The lamp unit is constructed with three plates respectively constructed with blue, green, red LED arrays in which red (R), green (G), and blue (B) LED modules are separated from one another. The LED arrays are sequentially driven according to a frequency of 180 Hz so as to sequentially provide light beams with R, G, and B colors. On the other hand, a lamp unit of a light source unit 300 according to another embodiment of the present invention is constructed with two plates in which red LEDs and blue LEDs are sequentially arranged in a module to construct an LED array, and green LEDs are sequentially arranged to construct an LED array or one plate in which red, green and blue LEDs are sequentially arranged to construct an LED array. In addition, the lamp unit of the first light source unit 112 according to the embodiment may be constructed with organic light emitting diodes (OLEDs), laser diodes (LDs), and the like, in addition to the LED array or constructed with a point light source or a surface light source.

Since the first light source unit is known to those skilled in the art, detailed description on the first light source unit will be omitted throughout the specification.

The first light modulation device 122 outputs a predetermined image by modulating light provided from the first light source unit in response to an image signal provided from the first driving unit. A transmissive or reflective light modulation device such as a liquid crystal display (LCD) panel, a digital micromirror device (DMD), a grating light valve (GLV) device, a liquid crystal on silicon (LCoS), and the like may be selectively used as the first light modulation device 122.

The first projection lens unit 132 magnifies and projects an image that is output from the first light modulation device 122.

As shown in FIG. 2, an image projected from the projection lens unit of the multimedia player according to the first embodiment of the present invention is formed at a predetermined position ('a' area of FIG. 2) extended from a bottom plane over which a housing unit is located. Accordingly, the multimedia player according to the first embodiment of the present invention forms an image at a position spaced apart from the projection lens unit by a constant distance ('d' of FIG. 2) by using the bottom plane as a screen. As a result, if an optical system of the multimedia player comes into focus by initially setting the optical system once, it is unnecessary to additionally set the optical system whenever the optical system is used. It is possible to display a clear image at any time.

As shown in FIG. 2, an image corresponding to an input device such as a keyboard is displayed on one of the two projection screens. The image serves as a function of the input device such as a virtual keyboard and a virtual mouse. At this time, in order to provide functions of the virtual keyboard and the virtual mouse, the multimedia player further includes a complementary metal-oxide semiconductor (CMOS) camera and an infrared laser. A position pointed by a finger is recognized in real time by capturing and analyzing the image of the virtual keyboard in real time by using the CMOS camera. It is possible to determine whether the bottom plane is touched by sensing reflection of a laser beam due to a finger that contacts the bottom plane by using the infrared laser. Although an example of a method of providing a virtual keyboard function by using the CMOS camera and the infrared laser is described, various techniques may be also applied.

Second Embodiment

Hereinafter, a structure and an operation of a multimedia player for providing two projection images according to a second embodiment of the present invention will be described in detail with reference to FIG. 3. FIG. 3 is a schematic diagram illustrating an inner structure of a multimedia player for providing two projection images according to a second embodiment of the present invention. The multimedia player according to the second embodiment provides two projection images by using a light source unit and a polarization beam splitter (PBS).

Referring to FIG. 3, the multimedia player 30 according to the second embodiment includes a single light source unit 300, a PBS 310, a first light modulation device 320, a first projection lens unit 330, a second light modulation device 340, a second projection lens unit 350, and a driving unit (not shown).

The driving unit controls an entire operation of the multimedia player 30. The driving unit controls operations of the light source unit 300, and the first and second light modulation devices 320 and 340. Specifically, in order to display two different images, the driving unit provides first and second image signals corresponding to first and second images to the first and second light modulation devices 320 and 340, respectively.

Since the light source unit 300 is the same as the light source unit according to the first embodiment, repeated description on the light source unit 300 will be omitted.

The PBS 310 provides first and second polarized light beams along different light paths by splitting light provided from the light source unit into two orthogonal light beams which are first and second polarized light beams (for example, P-wave and S-wave).

It is known that light is a wave. A wave is constructed with two orthogonal wave components which are a P-wave and an S-wave. The P-wave is a longitudinal wave of which a propagation direction is the same as an oscillation direction of a medium. The S-wave is a transverse wave of which a propagation direction is perpendicular to an oscillation direction of a medium. Since terms of the P-wave and the S-wave are known to those skilled in the art, detailed description on the terms will be omitted.

A path of the P-wave of light provided from the light source unit is changed by passing through the PBS 310, thereby proceeding along a direction perpendicular to the propagation direction. A path of the S-wave of light provided by the light source unit is maintained by passing through the PBS 310, thereby proceeding along a direction that is the same as the propagation direction.

The first light modulation device 320 is located in a path through which the P-wave that is the first polarized wave provided from the PBS 310 proceeds so as to provide a first image by modulating the first polarized wave in response to a first image signal provided by the driving unit. The first light modulation device 320 may use a transmissive light modulation device. The transmissive light modulation device may be a transmissive micro display device.

The first projection lens unit 330 is located in front of the first light modulation device to magnify and project the first image provided from the first light modulation device.

The second light modulation device 340 is located in the path through which the S-wave that is the second polarized wave provided from the PBS 310 proceeds so as to provide a second image by modulating the second polarized wave according to a second image signal provided by the driving unit. The second light modulation device 340 may use a reflective light modulation device. An LCoS, reflective LCD, or DMD device may be selectively used as the reflective light modulation device.

In a case where the second light modulation device is a reflective LCoS light modulation device, the second projection lens unit 350 is located in a path through which light reflected from the second light modulation device and reflected from the PBS is output so as to magnify and project the second image provided from the second light modulation device. On the other hand, in a case where the second light modulation device is a reflective DMD light modulation device, it is possible to provide a predetermined image at a desired position by adjusting an angle of a location of the second light modulation device and positioning a second projection lens unit in a path of light.

As shown in FIG. 3, different images are formed on screens ('a' and 'b') which are located at different positions by constructing the first light modulation device with the transmissive light modulation device and constructing the second light modulation device with a reflective light modulation device.

In another embodiment of the present invention, both of the first and second light modulation devices may be constructed with transmissive light modulation devices or reflective light modulation devices. In addition, it is possible to change angles in which the first and second projection images are formed by freely changing a path of light that is output from the first and second light modulation devices by using a reflection mirror.

The multimedia player for providing two projection images according to the second embodiment operates in a dual mode by concurrently providing different first and second images at different positions by using a single light source unit. Specifically, images projected from the first and second projection lens units of the multimedia player according to the second embodiment are formed at predetermined positions ('a' and 'b' areas of FIG. 3) extended from a bottom plane.

Accordingly, the multimedia player according to the second embodiment of the present invention forms an image at a position spaced apart from the first and second projection lens units by a constant distance by using a bottom plane as a screen. As a result, if an optical system of the multimedia player comes into focus by initially setting the optical system once, it is unnecessary to additionally set the optical system whenever the multimedia player is used. It is possible to display a clear image at any time.

Since the multimedia player for providing two projection images according to the second embodiment can concurrently project two different images by using a light source unit, it is possible to miniaturize the multimedia player and reduce the entire power consumption. Accordingly, the multimedia player according to the second embodiment may be applied to a mobile or portable terminal. In addition, it is possible to display a clear image at any time by initially setting an optical system once in a case where the multimedia player for providing two projection images according to the second embodiment uses a bottom plane over which the housing unit is located as a screen.

Third Embodiment

Hereinafter, a structure and an operation of a multimedia player for providing two projection images according to a third embodiment of the present invention will be described in detail. The multiplayer player according to the third embodiment provides two clear projection images by sensing a color of a bottom plane that serves as a screen and increasing brightness of a complementary color of the sensed color and displaying the complementary color of the sensed color. Description on components of the multimedia player according to the third embodiment which are the same as those of the multimedia player according to the first embodiment will be omitted.

The multimedia player according to the third embodiment further includes a screen sensing unit in addition to the components of the multimedia player according to the first embodiment. The screen sensing unit may be constructed with a color sensor for sensing colors or a CMOS camera. The driving unit of the multimedia player senses the color of the bottom plane to be a screen by using a screen sensing unit or captures an image of the bottom plane by using the CMOS camera. Next, a mean color is obtained by calculating a mean value of the color of the bottom plane from the captured image or sensed color. Then, the complementary color of the mean color is determined. For example, in a case where a mean color of the bottom plane is bluish green, red that is the complementary color of bluish green is determined. An image is modified so that brightness of a light source corresponding to a complementary color among R, G, and B light sources is increased by using the determined complementary color and so that brightness of a light source corresponding to the bottom color is decreased. Visibility of the image formed on the screen is improved by increasing a contrast ratio of the image through this procedure of modifying brightness of light sources. For example, in a case where the color of the bottom plane is bluish green, brightness of an R-light source is increased within a predetermined range, and brightness of G and B light sources are decreased within predetermined ranges.

On the other hand, the first and second driving unit according to an embodiment of the present invention may modify image data to be displayed instead of controlling brightness of light sources. More specifically, the first and second driving units generates new image data by increasing image data corresponding to the complementary color among image data and decreasing image data corresponding to the color of the bottom plane and display the new image data. In the embodiment, it is possible to improve visibility of images to be displayed on the bottom plane.

While the present invention has been particularly shown and described with reference to exemplary embodiments thereof, it will be understood by those skilled in the art that various changes in form and details may be made therein without departing from the spirit and scope of the present invention as defined by the appended claims. For example, in an embodiment of the present invention, the structure of the lamp unit of the light source, the light modulation device, and the like may be changed and used in various manners so as to improve the entire performance of the multimedia player. All differences within the scope will be construed as being included in the present invention as defined by the appended claims.

INDUSTRIAL APPLICABILITY

A technique according to an embodiment of the present invention may be widely used for a mobile communication terminal or mobile personal information terminal such as a portable multimedia player (PMP) or personal digital assistant (PDA).

The invention claimed is:

1. A multimedia player capable of displaying two projection images, the multimedia player comprising:
a first projection unit displaying a first projection image; and
a second projection unit displaying a second projection image,
wherein the first projection unit comprises:
a first driving unit controlling an operation of the first projection unit and providing an image signal of the first projection image to be displayed;
a first light source unit;
a first light modulation device outputting the first projection image by modulating light provided from the light source in response to the image signal of the first projection image; and
a first projection lens unit magnifying and projecting an image that is output from the first light modulation device, and
wherein the second projection unit comprises:
a second driving unit by controlling an operation of the second projection unit and providing an image signal of the second projection image to be displayed;
a second light source unit;

a second light modulation device outputting the second projection image by modulating light provided from the light source unit in response to the image signal of the second projection image; and a second projection lens unit magnifying and projecting an image that is output from the second light modulation device, wherein focal lengths of the first and second projection lens units are initially set so that an image is projected at a predetermined position extended from a bottom plane over which the multimedia player is located, wherein the first light source unit and the second light source unit are constructed with LED arrays constructed with red (R), blue (B), and green (G) LEDs, and the LED arrays are sequentially driven according to a predetermined frequency to sequentially provide light beams with R, G and B colors, the multimedia player further comprising a screen sensing unit sensing a color of an area in which an image is to be displayed, wherein the first and second driving units detect a complementary color of the sensed color of the bottom plane by using the screen sensing unit and increase brightness of alight source corresponding to the complementary color among light sources of the first and second light source units.

2. The multimedia player of claim 1, wherein ones of a LCD (liquid crystal display) panel, a DMD (digital micrometer device), a GLV (grating light valve) device, and a LCoS (liquid crystal on silicon) device are selectively used as the first and second light modulation devices.

3. The multimedia player of claim 1, further comprising a screen sensing unit sensing a color of an area in which an image is to be displayed, wherein the first and second driving units detect a complementary color of the sensed color of the bottom plane by using the screen sensing unit and increase image data corresponding to the complementary color among image data to be displayed.

4. A multimedia player providing two projection images which operates in a dual mode by concurrently providing first and second images by using a single light source unit, the multimedia player comprising:

a driving unit controlling an entire operation and providing first and second image signals;

a light source;

a polarization beam splitter splitting light provided from the light source unit into first and second polarized light beams;

a first light modulation device located in a path through which the first polarized light beam provided from the PBS (polarization beam splitter) proceeds, the first light modulation device modulating the first polarized light beam in response to a first image signal and providing the first image;

a first projection lens unit magnifying and projecting the first image provided from the first light modulation device;

a second light modulation device located in a path through which the second polarized light beam provided from the PBS proceeds, the second light modulation device modulating the second polarized light beam in response to a second image signal and providing the second image; and a second projection lens unit magnifying and projecting the second image provided from the second light modulation device, wherein images projected from the first and second projection lens units are formed at previously set first and second positions, wherein focal lengths of the first and second projection lens units are initially set so that an image is projected at a predetermined position extended from a bottom plane over which the multimedia player is located, and wherein the light source is constructed with LED arrays constructed with red (R), blue (B), and green (G) LEDs, and the LED arrays are sequentially driven according to a predetermined frequency to sequentially provide light beams with R, G and B colors, the multimedia player comprising a screen sensing unit sensing a color of an area in which an image is to be displayed, wherein the driving unit detects a complementary color of the sensed color of the bottom plane by using the screen sensing unit and increases brightness of a light source corresponding to the complementary color among light sources of the light source unit.

5. The multimedia player of claim 4, wherein the first light modulation device is a transmissive light modulation device or reflective light modulation device.

6. The multimedia player of claim 4, wherein the second light modulation device is a transmissive light modulation device or reflective light modulation device.

7. The multimedia player of claim 4, further comprising a screen sensing unit sensing a color of an area in which an image is to be displayed, wherein the driving unit detects a complementary color of the sensed color of the bottom plane by using the screen sensing unit and increases image data corresponding to the complementary color among image data to be displayed.

* * * * *

UNITED STATES PATENT AND TRADEMARK OFFICE
CERTIFICATE OF CORRECTION

| | | |
|---|---|---|
| PATENT NO. | : 8,297,758 B2 | Page 1 of 1 |
| APPLICATION NO. | : 12/449647 | |
| DATED | : October 30, 2012 | |
| INVENTOR(S) | : Byeong-Dae Choi et al. | |

It is certified that error appears in the above-identified patent and that said Letters Patent is hereby corrected as shown below:

Column 9, claim 1, line 24, change "alight" to --a light--.

Signed and Sealed this
Fifteenth Day of January, 2013

David J. Kappos
*Director of the United States Patent and Trademark Office*